(12) United States Patent
Hein (10) Patent No.: US 7,665,687 B2
(45) Date of Patent: Feb. 23, 2010

(54) CLIP STORAGE DRUM PROVIDED WITH A TRANSPONDER

(75) Inventor: Klaus Hein, Gedern (DE)

(73) Assignee: Poly-Clip System GmbH & Co. KG (DE)

( * ) Notice: Subject to any disclaimer, the term of this patent is extended or adjusted under 35 U.S.C. 154(b) by 0 days.

(21) Appl. No.: 12/112,619

(22) Filed: Apr. 30, 2008

(65) Prior Publication Data

US 2008/0272225 A1 Nov. 6, 2008

(30) Foreign Application Priority Data

May 4, 2007 (DE) .................. 20 2007 006 428 U (51) Int. Cl.
*B65H 75/08* (2006.01)
(52) U.S. Cl. .................. 242/613; 242/613.4; 242/609; 242/912
(58) Field of Classification Search ................. 242/613, 242/609, 609.1, 613.4, 614, 607, 912
See application file for complete search history.

(56) References Cited

U.S. PATENT DOCUMENTS

| | | | | |
|---|---|---|---|---|
| 4,083,509 A | * | 4/1978 | Vasudeva et al. | 242/608.8 |
| 4,088,278 A | * | 5/1978 | Adair | 242/608.8 |
| 4,176,804 A | * | 12/1979 | Nemoto et al. | 242/609.1 |
| 4,903,913 A | * | 2/1990 | McCaffrey | 242/608.6 |
| 5,967,454 A | * | 10/1999 | Yarnell et al. | 242/608.4 |
| 5,967,455 A | * | 10/1999 | Farber | 242/613 |
| 6,334,587 B1 | * | 1/2002 | Roder | 242/563 |
| 6,824,320 B1 | * | 11/2004 | Kerr et al. | 396/512 |
| 7,325,380 B2 | * | 2/2008 | Ebert | 53/417 |
| 2003/0189125 A1 | * | 10/2003 | Trierenberg | 242/563 |
| 2006/0180694 A1 | * | 8/2006 | Battles et al. | 242/348 |
| 2008/0061187 A1 | * | 3/2008 | Couchey et al. | 242/608.8 |

FOREIGN PATENT DOCUMENTS

| | | |
|---|---|---|
| DE | 101 15 200 A1 | 10/2002 |
| DE | 101 31 807 C1 | 11/2002 |
| DE | 10 2005 033 437 A1 | 2/2007 |
| EP | 1 266 830 A1 | 12/2002 |
| EP | 1 695 913 A2 | 8/2006 |
| EP | 1 860 596 A1 | 11/2007 |
| NL | 9400392 A | 10/1995 |
| WO | 2004/106201 A1 | 12/2004 |

* cited by examiner

*Primary Examiner*—Sang Kim
(74) *Attorney, Agent, or Firm*—Hahn Loeser & Parks LLP; Michael H. Minns (57) ABSTRACT

A drum for storing and dispensing a coiled material wound on the drum, in particular a line of clips, the drum comprising a drum body which has a hub and side walls respectively disposed at the axial end faces of the hub, the side walls extending beyond the outer circumferential surface of the hub in the radial direction, wherein the storage space defined by the inner facing surfaces of the side walls and the hub and extending circumferentially around the hub is used to accommodate the coiled material. The drum body has at least one dielectric region for accommodating at least one transponder on an area of the hub facing away from the storage space for the coiled material.

13 Claims, 4 Drawing Sheets

CLIP STORAGE DRUM PROVIDED WITH A TRANSPONDER

BACKGROUND OF THE INVENTION

The present invention relates to a drum for storing and dispensing a coiled material wound on the drum in a clipping machine, in particular a sausage clipping machine.

In particular, the invention relates to a drum for storing and dispensing a coiled material wound on the drum, in particular a line of clips, the drum comprising a drum body having a hub and side walls respectively disposed at the axial end faces of the hub, the side walls extending beyond the outer circumferential surface of the hub in the radial direction. The storage space defined by the inner facing surfaces of the side walls and the hub and that extends circumferentially around the hub is used to accommodate the coiled material.

It is known, in practice, that when producing sausage products the sausage meat is fed by a filling machine to a clipping machine via a filling tube. In the clipping machine, the filling material is filled into a tubular casing material that is closed at one end by a first clip, and the tubular casing material is closed by placing a second clip. Each pair of closing tools comprises an upper die and a lower die, between which the clip is shaped during closure until the minimum distance between the closing tools is reached. After clipping, the closing tools are returned to their initial or open position. The casing material of the resultant sausage product is then separated from the remaining supply of casing material, and the finished sausage product is carried out of the clipping machine.

Such a closure must meet high quality standards. On the one hand, it must not be so firm that the casing is damaged during closure. On the other hand, however, the closure must be sufficiently secure and tight so that the clip does not slip off the casing material and/or that sausage meat does not escape from the casing material when the sealed sausage is subjected to further subsequent processing such as cooking, smoking, etc.

When the clipping machine is to be used for many different sausage products using a number of different casing materials, different clips are applied that differ in respect of both their material and their dimensions (leg length and thickness of material). For this reason, closing tools are used that match the particular clip type being applied, in order to achieve a precisely defined deformation of the clip during closure.

To ensure that the production process can be carried out at high cycle rates without interruption, a large number of clips must be provided at the clipping machine. In practice, this is done by providing clips in the form of an metal strand pressed into a corrugated shape and wound on a drum, the clips being joined at the ends of their side legs to form a single strand. The clip required in each case is separated from the coil of clips and closed by means of the closing tools.

Since the closing tools and the clips match each other in size, it is also necessary to replace the closing tools whenever the clip size is changed, for example to make sausage products having a different calibre. To simply this matching and to exclude operating errors, the closing tools and the drum storing the coiled line of clips are provided with labels containing information about the tool and the clip, respectively.

Such a system is described in DE 10 2005 033 437 (U.S. Pat. No. 7,325,380). The drum on which a respective line of clips is coiled is fitted with an RFID tag. Clip information, such as clip size, clip material, etc., is stored on said tag. The information can be retrieved by a reading device provided on the clipping machine, and forwarded to the control system for the clipping machine. RFID tags are likewise applied to the closing tools belonging to the clipping machine, these tags containing information about the closing tool, in particular about the clip that can be processed by the tool. This information can likewise be retrieved by a reading device provided on the clipping machine, and forwarded to the control system for the clipping machine. The controller, or more precisely a comparison circuit in the controller, compares the retrieved information about the closing tools and about the clip supply and supplies a compatibility signal to the controller of the clipping machine. When the compatibility of the clip and the tool has been established, a start signal is outputted and the production process can begin.

However, these known drums have disadvantages. For example, an RFID tag applied to the drum body can be very easily removed or be damaged by moved machine parts, thus hindering or preventing the information from being retrieved. Furthermore, if the RFID has detefective shielding, retrieving the information is more difficult, or the information gets corrupted.

SUMMARY

An object of the present invention is therefore to provide a drum which overcomes the aforementioned disadvantages. Another object of the present invention is to provide a drum in which the functional reliability of a transponder is further improved by means of suitable shielding.

What is proposed, in particular, is a drum for storing and dispensing a coiled material wound on the drum, in particular a line of clips, the drum comprising a drum body having a hub and side walls respectively disposed at the axial end faces of the hub, the side walls extending beyond the outer circumferential surface of the hub in the radial direction. The storage space defined by the inner facing surfaces of the side walls and the hub and which extends circumferentially around the hub is used to accommodate the coiled material. It is also proposed that the drum body of the inventive drum has at least one dielectric region for accommodating at least one transponder on an area of the hub which faces away from the storage space for the coiled material.

By mounting the transponder on an area of the hub that faces away from the storage space for the coiled material, the transponder is protected against damage by the coiled material when the coiled material is being wound onto or off the drum. The dielectric configuration of the storage area for the transponder also protects the transponder against disruptive effects on signal transmission that may be caused by the coiled material, for example, when the coiled material consists of a metallic material.

A dielectric region can be provided in a variety of ways. In one advantageous embodiment of the inventive drum, the dielectric region is formed by at least one section of thickened material being provided. Producing this section of thickened material can be integrated by simple means into the drum body production process. Another option is that the at least one dielectric region is formed by a recess provided on the surface of the hub or of the inner circumferential surface of the hub facing away from the coiled material. Such a solution is advantageous, particularly when the mounting member on which the drum is disposed inside a machine is made of a material that has no effect on the functional operation or manner of operation of the transponder. This is particularly the case when a plastic is used for the drum mounting member.

Another advantageous way of providing a dielectric region is to manufacture the hub as a double-walled structure. A cavity is thus provided in the hub wall, in which the transponder is protected against any kind of mechanical and/or electrical interference.

If the dielectric region is provided on the circumferential wall of the double-walled hub that is closer to the hub axis, the transponder can be protected in this manner against interference from the closure means, which are generally metallic. It is also advantageous in this regard when the dielectric region is provided on the surface, facing away from the hub axis, of the circumferential wall of the double-walled hub that is closer to the hub axis. In other words, the dielectric region is disposed on the outer circumferential surface of the first hub wall of the double-walled hub. Another option, of course, is that the transponder can be disposed on the inner circumferential surface of the second wall of the double-walled hub. The latter arrangement is advantageous particularly when the mounting member of the machine in which the drum is used is made of a metallic material.

The double-walled structure of the hub can be realized in different ways in order to form the dielectric region. It is advantageous, for example, when arcuate shells, which surround the hub at least approximately completely, are disposed on the hub at a distance from the outer circumferential surface of the hub. Hence, by disposing the arcuate shells on the hub, a drum provided with a dielectric region can be produced with little production effort after a standard storage drum has been completed.

When winding the coiled material onto the drum and off the drum, corresponding forces also act on the hub of the drum. To prevent the double-walled hub from being squeezed together, thus resulting in damage to the dielectric region and the transponder, it is advantageous that the arcuate shells each have at least one spacer member on their inner circumferential surface facing the hub. As an alternative to this arrangement, it is also possible for the hub to have at least one spacer member on its outer circumferential surface facing the arcuate shells.

In one advantageous configuration, the spacer member is formed by at least one rib extending in the circumferential direction of the hub. It is also possible, of course, that two or more ribs extending in the circumferential direction of the hub are provided parallel to each other at an axial distance from each other. Such ribs are construction elements that are easily produced, but very effective. Above all, they can be produced very easily by casting or injection molding if plastics are used as material.

In another advantageous configuration, the arcuate shells are formed by two preferably identical half-shells. These two half-shells can be mounted automatically on the hub in a simple process.

If the half-shells are identically configured, the assembly for automatic attachment is simplified due to the use of identical tools. By reducing the number of different parts, production costs can also be reduced.

In order to prevent unintentional or manipulative modification or removal, for example of the transponder, it is advantageous that the arcuate shells are permanently connected to each other. If, on the other hand, the arcuate shells are detachably connected to each other, it is possible to continue using a drum by replacing the transponder in the event of a defect, or if the coiled material is to be replaced.

In order to save additional costs, the arcuate shells can be produced from the same material as the hub. By selecting the same material, damaging effects resulting from different material properties can be prevented, such as cracking or stresses due to different thermal expansion characteristics.

Plastic is a proven material in construction due to its variety of forms. Compared to most metals, it is light and easy to process. It also has sufficient stability for many applications. In another preferred embodiment, the drum body is therefore made of plastic.

If the transponder is an RFID tag, contactless transmission of information is made possible in an advantageous manner. This also prevents wearing that results from parts coming into contact with each other. The reader device for the RFID tag may also be mounted at any desirable location, provided only that the reader device is positioned within range of the RFID tag.

In order to ensure controlled rotation of the drum, the hub should be provided with at least one torque transmission member on its inner circumferential surface facing the hub axis. The coiled material is normally wound off the drum by the draw-off tension of the device for feeding the coiled material, without need of a drive for the drum. To prevent the supply of coiled material from being unwound unintentionally by centrifugal forces, a braking torque may be applied to the drum via the torque transmission members.

If the drum body is formed of two half-members that can be interconnected in a plane which intersects the hub axis, the half-members may be interconnected by means of a simple welding or bonding process. This avoids any complicated design of the casting or injection mold. If the half-members are identically configured, it is possible to save additional costs by reducing the number of different parts. Of course, the drum may also be produced as an integral part in a single injection-molding operation.

DESCRIPTION OF THE DRAWINGS

Other advantageous configurations and embodiments of the invention shall now be described in greater detail with reference to the description of an embodiment and to the attached drawings. The terms "top", "bottom", "left" and "right" used when describing the embodiment relate to the drawings oriented in such a way that the reference numerals and names of the figures can be read normally in which.

DETAILED DESCRIPTION OF THE DRAWINGS

The embodiments of the inventive drum for storing and dispensing a coiled material wound on the drum, as described in the following, are used in a clipping machine, in particular in a sausage clipping machine, of the kind initially specified. The coiled material is a line of clips made of metal. The inventive drum is pushed onto a mounting member of the respective machine, on which it is disposed non-rotatingly as well as axially stationarily, but also capable of being detached again. The mounting member may be made of plastic or a metallic material. The following proposals are provided for both embodiments of such a machine-side drum mounting member.

Figure 1:
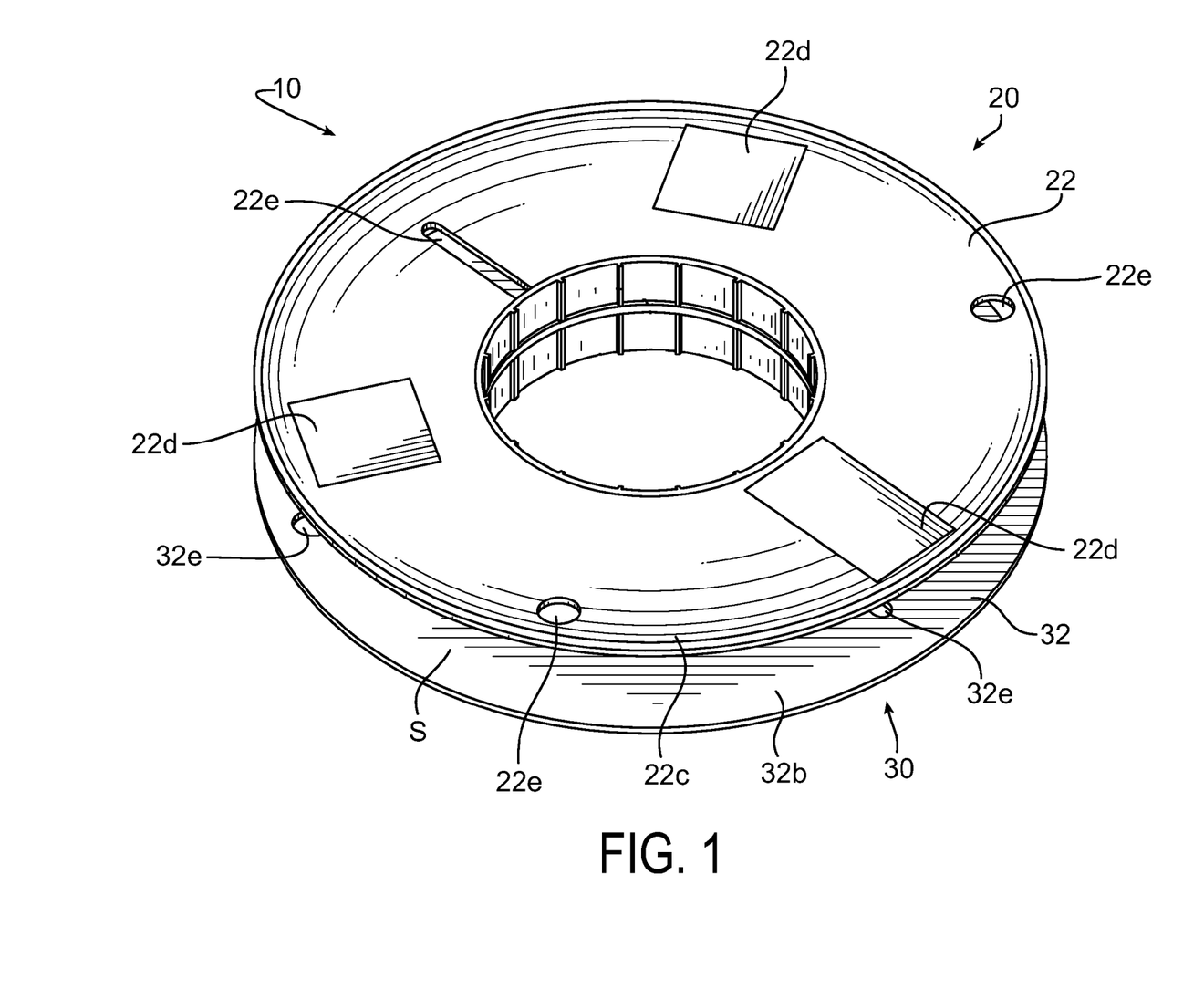
FIG. 1 shows a perspective view of a first embodiment of the inventive drum.

FIG. 1 shows a first embodiment of the inventive drum 10, which includes a drum body. Drum body 10 has two annular wall members 22, 32 that form the lateral boundary surfaces of a storage space S of the drum, which shall be described in further detail below. Hub 50 extends between the two wall members 22, 32. Both wall members 22, 32 surround a circular through hole 22a, 32a, which is disposed coaxially to the central axis of wall members 22, 32 and corresponds to the inner diameter of the hub. The outer diameter of the two wall members 22, 32 and the inner diameter of the two through holes 22a, 32a are at least approximately identical. The space enclosed by the outer circumferential surface 50a of hub 50 and inner facing surfaces 22b, 32b of wall members 22, 32 forms the aforementioned storage space S for the coiled material.

Carriers 52 are formed, preferably integrally, on the inner circumferential surface 50b of hub 50, i.e., on the surface of hub 50 facing the machine-side mounting member or shaft (not shown) for receiving the drum. Carriers 52, which preferably have a square cross-section, extend in the axial direction, i.e., parallel to the rotational or hub axis A of the drum. As shown in FIG. 1, they are distributed in the circumferential direction on the inner circumferential surface 50b of hub 50 in a uniformly spaced-apart manner. Carriers 52 are used for connecting drum body 10 with a positive lock to the mounting shaft (not shown) of the clipping machine, on which the drum in operation is fixed in a non-rotating and axially stationary yet detachable manner. Carriers 52 ensure controlled and non-slipping rotation of the drum with the shaft. The shaft, of course, has recesses corresponding in number and shape to carriers 52.

If the drum is not driven by the receiving shaft of the respective machine, but the rotational movement of the drum is instead the result of pulling the coiled material off the drum, carriers 52 are not used for transferring a drive torque to the drum or to drum body 10, but for transferring a braking torque to the drum. The specific intention here is to prevent the drum from continuing to rotate when the coiled material is pulled off, such that drum body 10 and the drum itself always occupies a defined position.

The inner circumferential surface 50b also has a bead 40 extending circumferentially in the axial center of the inner circumferential surface 50b, the bead serving to axially fix the drum and drum body 10 on the mounting member of the respective machine. This axial fixing can be effected by spring-loaded detent elements that are pressed to the side or radially inwards by bead 40 when the drum is pushed axially onto the mounting member of the machine, and which are moved radially outwards by the springs when bead 40 moves over and away from them. By this means, as mentioned before, the drum is disposed in an axially secure manner on the receiving shaft of the machine.

As can likewise be seen from FIG. 1, an outer side 22c of the two wall members 22, 32 has labeling regions 22d distributed uniformly thereon. These regions can be used, for example, to receive stickers that can be read by the naked eye and/or for forming producer markings on these regions.

Through holes 22e, 32e in wall members 22, 32 (also shown) are orifices distributed across said wall members, on the one hand, or elongate, radially extending holes, on the other hand. The elongate holes are used for checking the filling level of the coiled material. The round through holes, in contrast, are used for securely fixing the free end of the coiled material when it has not been completely used up and when the drum is removed from the mounting member in the machine. This is done by inserting the free end of the coiled material, for example of a wound strand, through the hole. It should also be noted here that the end of the coiled material that is close to the outer circumferential surface 50a of hub 50 may be fixed to hub 50.

Figures 2, 3:
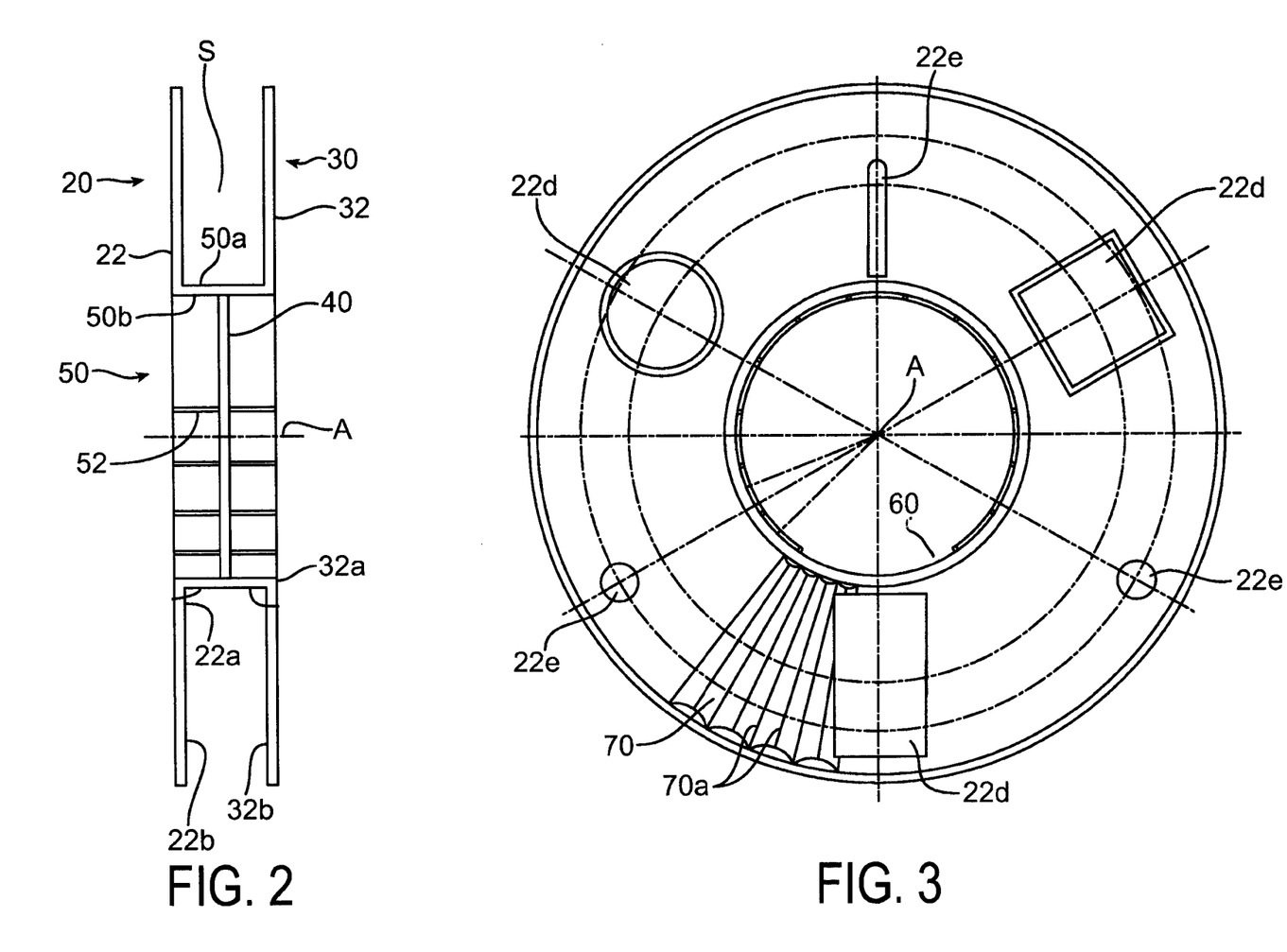
FIG. 2 shows a sectional view of the drum in FIG. 1, in a plane which cuts through the rotational axis.
FIG. 3 shows a plan view of the drum shown in FIGS. 1 and 2.

On the drum of the first embodiment, the dielectric region for mounting the transponder is formed by recess 60 located on the inner circumferential surface 50b of hub 50, as can be seen from FIG. 3. Recess 60 has a surface area that is slightly larger than the outer dimensions of the transponder. Recess 60 also has a radial depth that is at least equal to the height or thickness of the planar transponder. The transponder may be provided for mounting purposes with an adhesive layer, by means of which it can be attached to the bottom, radially inwardly facing surface of recess 60. This first embodiment is advantageous particularly when the machine-side mounting member for the drum is made of a non-metallic material, in particular a plastic. Since the plastic has no influence on the functional operation of the transponder, the transponder is protected by recess 60 against effects that may be caused by a metallic coiled material, for example. In the following, and with reference to the second embodiment, an embodiment is described which is advantageous particularly when the drum mounting member fo the machine is made of a metallic material, and a metallic material is used in the coiled material itself.

In the plan view, shown in FIG. 3, of drum 10 in FIGS. 1 and 2, a region 70 is shown in addition to the known elements of drum 10. It shows radially extending edges 70a on the outer surface of wall members 22, 32. These edges form a corrugated profile for improving the stability of wall members 22, 32. By means of this profile, it is also possible to reduce the thickness of the material of wall members 22, 32. Region 70 is shown here, purely by way of example, as a section on outer surface 22c, 32c of wall members 22, 32 and can extend, of course, across the entire outer surface 22c, 32c of wall members 22, 32. The other labeling regions 22d are likewise embodied as planar surfaces without such profile 70.

In addition to the integral embodiment of drum body 10 as described in the foregoing, it is also possible for drum body 10 to be made of two identical half-members 20, 30. These two half-members 20, 30 may be interconnected, for example by welding, in such a manner that the weld seam extends along bead 40.

The RFID tag contains a section in which RF information that can be machine-read electromagnetically in a contactless manner can be stored. Information about the clip located on the drum can be encoded in this section. In addition, a printable region may be provided on the label for information that can be read by the naked human eye, so that the clip size information can be manually entered if the machine-readable sections of the tag are damaged, or in the event of a reader unit failure.

The tag can be read by means of various sensor devices. The clipping machine in which the inventive drum can be used has a sensor device near the clip coil, in the form of a reader unit suitable for reading the RFID tag. The means for reading the information on the RFID tag comprises, in a known manner, transmitting and receiving antennae as well as electronic transmission and receiving circuitry with which the transponder of the tag can be activated.

To read the RFID tag, which may be arranged in different positions depending on the angular position of the drum, it may be necessary for the drum to be rotated firstly into a read position and/or to be moved past a normally stationary reader unit. This can be carried out automatically by means of a control program after insertion of a new supply of clips.

The identifier thus retrieved from the tag is supplied in the form of a clip information signal by the reader unit to a controller, or more precisely to an evaluation device.

The replaceable closing tools also have an identifier in the form of a tool label. A sensor device in the form of a reader unit for reading the tool label may be disposed in the region of the starting or open position of the first closing tool, for example.

The tool label, also, may include a section which can be read by the naked human eye.

The clip information signal thus determined by the reader unit from the identifier for the closing tool is likewise supplied to the evaluation device via a signal line. The evaluation device evaluates the clip information signal and the closing tool information signal, for example by comparing them with a table of data. If the comparison shows that the clip and the closing tool in use are compatible, then the evaluation device in the controller outputs a compatibility signal for further use.

Figure 4:
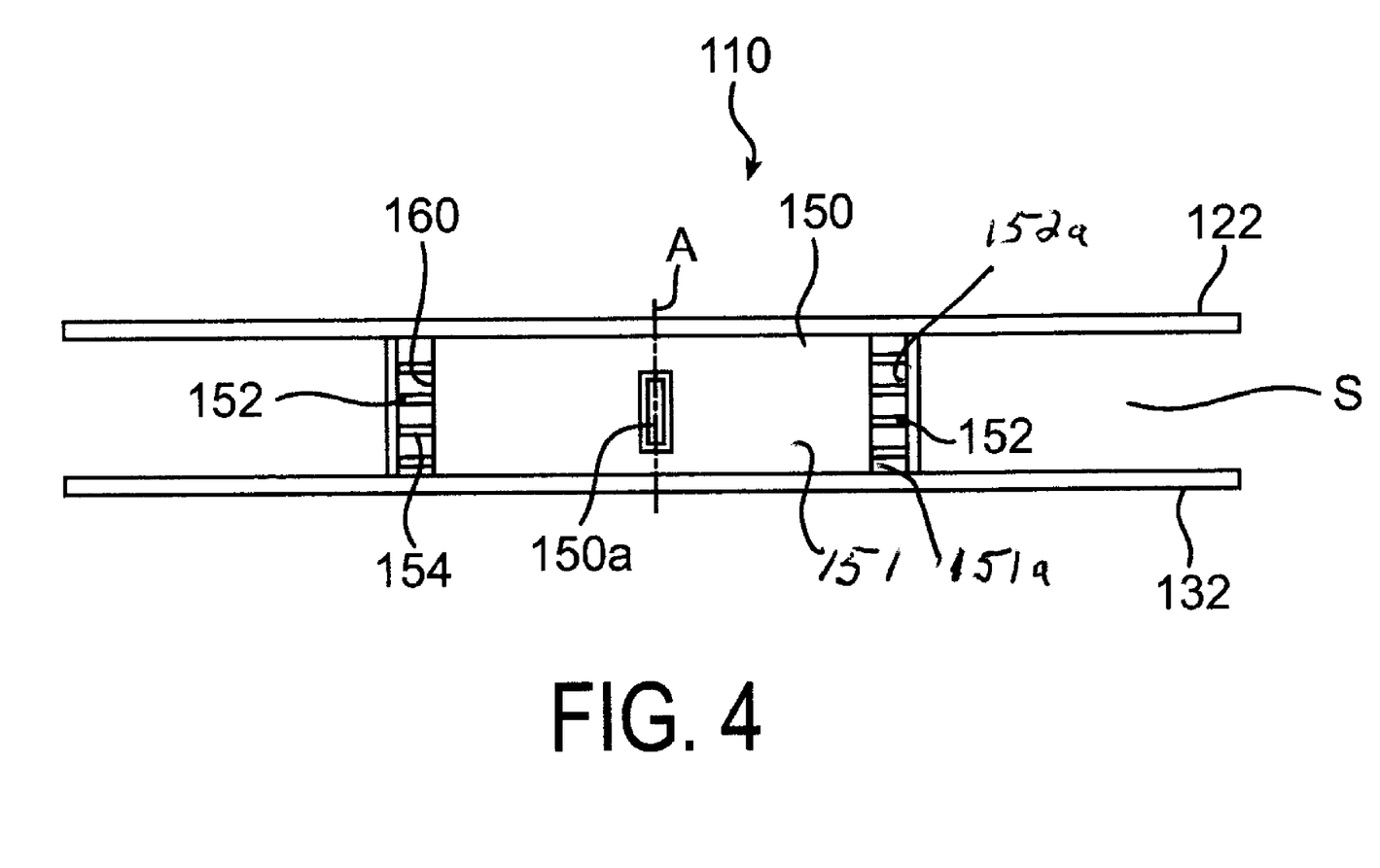
FIG. 4 shows a sectional view of a second embodiment of the inventive drum, in a plane which intersects the rotational axis.

FIG. 4 shows a sectional view of yet another embodiment of the inventive drum, in a vertical plane through the rotational or hub axis A. In the following description of the second embodiment of the invention, the same reference signs are used for functional and/or geometrically identical components as were used in the first embodiment according to FIGS. 1 to 3, but increased by 100.

In this embodiment also, the integral drum body 110 comprises wall members 122, 132 and hub 150, which together form storage space S for the coiled material.

However, as already described with reference to the first embodiment, the drum may also be made as an integral drum in a single injection-molding operation.

In contrast to the first embodiment as shown in FIGS. 1 to 3, the drum has a double-walled hub 150 as dielectric region 160. The double-walled hub 150 has a first hub wall 151 which is closer to the rotational or hub axis A, and a second hub wall 152 disposed further away in the radial direction from the rotational or hub axis, the latter wall being spaced at a radial distance from first hub wall 151. The second hub wall 152 extends perpendicularly between wall members 122, 132 of the drum and is disposed coaxially in respect of rotational axis A.

In order to increase the stability of double-walled hub 150, ribs 154 are arranged in the cavity between the first and the second hub walls 151, 152, so that the distance between hub walls 151, 152 is kept constant even under load. Ribs 154 may extend radially from the outer circumferential surface of first hub wall 151 to the inner circumferential surface of second hub wall 152 and preferably have a square cross-section. Ribs 154 extend between wall members 122, 132 around the entire circumference of the hub and are arranged in parallel as well as equidistant from one another in the axial direction. In addition to the integral arrangement of ribs 154 on the outer circumferential surface of first hub wall 151, as described above, ribs 154 may also be integrally formed on the inner circumferential surface of the second hub wall 152. Since this second embodiment of the inventive drum can be based on drum body 10 of the first embodiment according to FIGS. 1 to 3, with no ribs being provided on the outer circumferential surface of hub 50, the solution in which ribs 154 are mounted on the inner circumferential surface of the second hub wall 152 supports the use of the drum body 10 known from the first embodiment.

An area of thickened material 150a can also be seen on the outer circumferential surface of first hub wall 151. This thickened area extends radially from the outer circumferential surface of first hub wall 151 in the direction of second hub wall 152 and has an approximately rectangular cross-section, as shown in FIG. 4. The radial height of the thickened material is equal at most to the height of ribs 154, so as not to protrude into the second hub wall 152.

Figure 5:
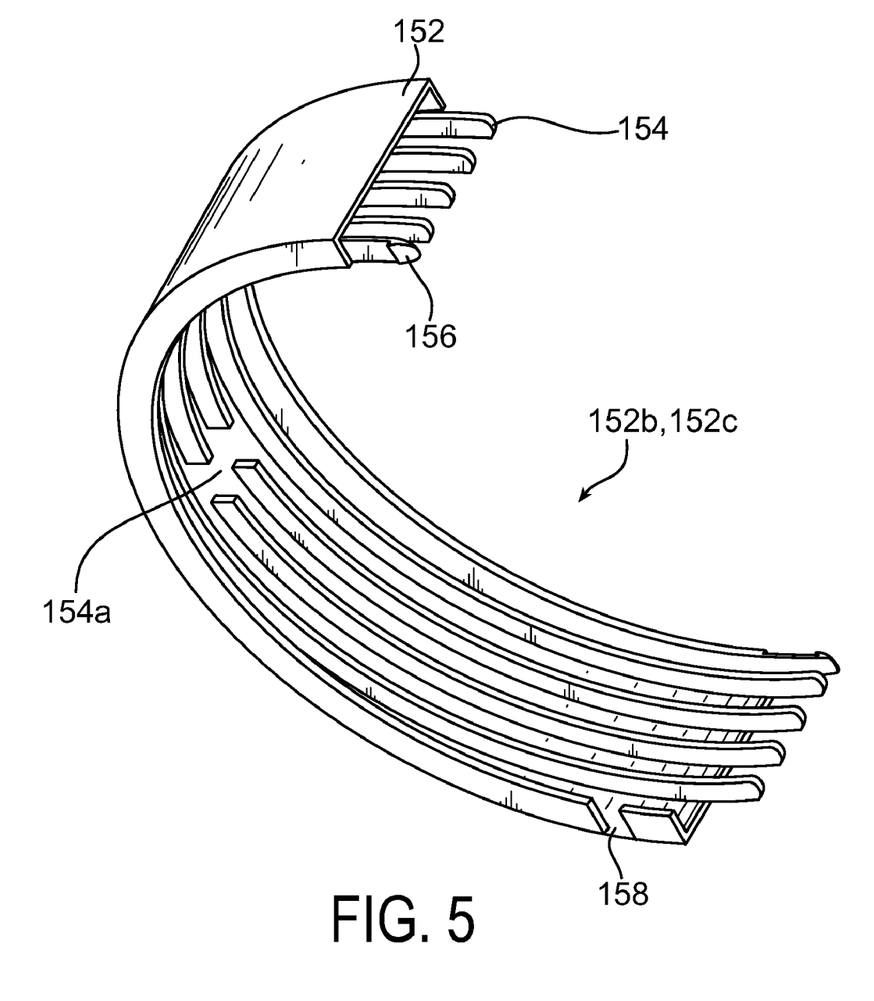
FIG. 5 shows a perspective view of a half-shell as seen in the embodiment in FIG. 4.

The double-walled structure of hub 150 and the second hub wall 152 positioned further outwards in the radial direction is formed by two half-shells 152b, 152c. FIG. 5 shows a perspective view of a half-shell 152b, 152c, wherein both half-shells 152b, 152c are identical in structure. For this reason, only one of the two half-shells 152b, 152c in FIG. 5 is explained in further detail below.

Half-shell 152b is semi-circular and encloses an angle of at least approximately 180°. Its width corresponds to the clearance or axial distance between wall members 122, 132 of the drum. The internal radius of half-shell 152b is equal to the outer radius of hub 150, whereas its outer radius is greater by the height of ribs 154 and the thickness of second hub wall 152 than the outer radius of first hub wall. Ribs 154 extend in radial orientation on inner circumferential surface of second hub wall 152 and extend beyond the latter in the circumferential direction by a certain length.

The outer ribs 154 arranged parallel to one another have a detent element 156 on one side, said element corresponding to counter detent element 158. Detent element 156 is formed by a hook on rib 154, which projects beyond the second hub wall 152 in the circumferential direction. Counter detent element 158 is located on the opposite corresponding end of rib 154, which does not extend beyond the second hub wall 152 in the circumferential direction. Counter detent element 158 is embodied as a recess in rib 154, said recess corresponding to the detent element 156 in the form of a hook, such that said hook can engage in recess 156.

As can be seen from FIG. 5, the double-walled structure is produced by two half-shells 152b, 152c, which are aligned mirror-invertedly to each other, placed around the first hub wall 151 and connected, preferably detachably, by detent and counter detent elements 156, 158.

It can also be seen from FIG. 5 that some ribs 154 have a recess or discontinuity 154a. The recess shown corresponds in size to the area of thickened material 150a of hub 150 in FIG. 4. Recess 154a and the area of thickened material 150a match each other in such a way that they engage each other when half-shells 152b, 152c are in the mounted state, thus forming an anti-rotational lock for half-shells 152b, 152c on the first hub wall 151.

In contrast to the first embodiment according to FIGS. 1 to 3, the transponder or RFID tag in the second embodiment of the drum is disposed in the cavity between hub walls 151, 152. The dielectric region 160 is formed thereby by the second hub wall 152 and protects the RFID tag, in the same manner as hub 50 in the first embodiment, against the effects of metallic objects in the region of the tag when the information stored on said tag is being retrieved.

The dielectric region 160 may be provided on the inner circumferential surface of the second hub wall and on the outer circumferential surface of the first hub wall 151. For the purpose of mounting the transponder or RFID tag, a recess (not shown) may be provided in each of hub walls 151, 152. Such a recess may be provided if, in particular, the transponder is to be mounted on that inner or outer circumferential surface of the first or second hub wall 151, 152 where ribs 154 are integrally formed. This recess may have the same configuration as provided for the recess 154a for the anti-rotation lock between the two mounted half-shells 152b, 152c of the second hub wall 152 and the first hub wall 151. There is also the possibility of mounting the transponder on a contiguously planar or smooth region of the outer circumferential surface 151a of the first hub wall or of the inner circumferential surface 152a of the second hub wall. Finally, it is possible to form a frame whose outer contour matches that of the transponder and which rises only slightly from the plane of the respective surface.

It should also be noted that, when the transponder is mounted on the outer circumferential surface of first hub wall 151 or on the inner circumferential surface of second hub wall 152, a raised portion protruding radially outwards or radially inwards (not shown) may be provided, and on which the transponder can be mounted. This raised portion is used to increase the radial distance from a metallic object, be it the drum mounting member in the machine on which the drum is used, the coiled material wound on the drum, or both. The radial height of this raised portion is dependent on the respective requirements, and is smaller by the radial height of the transponder than the radial distance between the outer circumferential surface of the first hub wall and the inner circumferential surface of the second hub wall.

Like the drum according to the first embodiment, the second embodiment of the inventive drum is used in the manner described above in a clipping machine which is able to read the information stored on the RFID tag, to compare that information with the closing tool information, for example, and to output corresponding signals to a controller.

One advantage of mounting the tag inside the double-walled hub 150 of the drum is that the RFID tag is protected against damage caused by transportation or by moved machinery parts. Another advantage is the protection against manipulation or loss.

Half-shells 152b, 152c may be detachably connected to each other by detent elements 156, 158, as shown in FIG. 5. However, they can also be interconnected in a permanent manner, for example by a weld.

As already mentioned, the RFID tag may also be mounted, of course, on the inner side of half-shells 152b, 152c. Further enhanced shielding by the dielectric region 160 can also be achieved by increasing the material thickness of the second hub wall 152.

Although not illustrated here, it is also possible for carriers 52 like those in the first embodiment of the drum to be likewise provided in the second embodiment of the drum, in order to ensure non-slipping rotation of the drum on an appropriately configured shaft.

The number of carriers 52 can likewise be chosen at will. In the simplest case, one carrier would suffice to ensure non-slipping rotation of the drum.

In addition to the solution described above, in which drum body 10 is used according to the first embodiment, and arcuate shell members 152b, 152c are placed on the outer circumferential surface of the first hub wall 151, corresponding to the outer circumferential surface 50a of hub 50 of drum body 10 according to the first embodiment, there is also the option, in respect of the drum with the double-walled hub, of forming the drum body 110 of the drum in the second embodiment with two identical half-members (not shown). These two half-members can be joined to each other, for example by a welding operation, in a vertical plane which intersects the rotational or hub axis A at an angle of 90°. In this case, the first hub wall 151 and the second hub wall 152 are joined securely in an integral manner to the respective side wall 122, 132. In this embodiment, it is also not necessary to provide ribs 154 because, as has just been explained, the two hub walls 151, 152 are each joined in an integral manner to the respective side wall 122, 132.

As already mentioned, the transponder may be an RFID tag. In order to prevent the transponder from detaching itself from the dielectric region 60; 160, it is advantageous for it to be provided with an adhesive on its flat sides. This adhesive can be protected by a protective film until the transponder is actually mounted. However, other fixing methods can be used for mounting the transponder in the drum in accordance with the first embodiment, shown in FIGS. 1 to 3, or in accordance with the second embodiment, shown in FIGS. 4 and 5.

The invention claimed is:

1. A drum for storing and dispensing a coiled material wound on the drum, said drum comprising:
    a drum body having a hub and side walls respectively disposed at axial end faces of the hub, said side walls extending beyond an outer circumferential surface of the hub in the radial direction, wherein a storage space is defined by inner facing surfaces of the side walls and the hub and extending circumferentially around the hub, the storage space being capable of accommodating the coiled material,
    the drum body having at least one dielectric region capable of accommodating at least one transponder on an area of the hub facing away from the storage space for the coiled material,
    the hub is a double-walled structure, the dielectric region is within the double walls, the double-walled structure comprises arcuate shells about the hub at a distance from an outer circumferential surface thereof, and the arcuate shells each have at least one spacer member on an inner circumferential surface thereof facing the hub.

2. The drum of claim 1, where the at least one dielectric region is a recess provided on an area of the hub facing away from the coiled material.

3. The drum of claim 1, where the arcuate shells are two half-shells.

4. The drum of claim 1, where the arcuate shells are connected to one other.

5. The drum of claim 1, where the drum body is plastic.

6. The drum of claim 1, where the transponder is an RFID tag.

7. The drum of claim 1, where the hub has on its inner circumferential surface facing the hub axis at least one torque transmission member.

8. The drum of claim 1, wherein the at least one spaced member extends radially from an outer circumferential surface of one hub wall to an inner circumferential surface of the other hub wall.

9. A drum for storing and dispensing a coiled material wound on the drum, said drum comprising:
    a drum body having a hub and side walls respectively disposed at axial end faces of the hub, said side walls extending beyond an outer circumferential surface of the hub in the radial direction, wherein a storage space is defined by inner facing surfaces of the side walls and the hub and extending circumferentially around the hub, the storage space being capable of accommodating the coiled material;
    the drum body having at least one dielectric region capable of accommodating at least one transponder on an area of the hub facing away from the storage space for the coiled material, the hub is a double-walled structure, the dielectric region being within the double walls, the double-walled structure comprises arcuate shells about the hub at a distance from an outer circumferential surface thereof, the arcuate shells each have at least one spacer member on an inner circumferential surface thereof facing the hub; and
    a transponder within the at least one dielectric region.

10. The drum of claim 9, where the at least one dielectric region is a recess provided on an area of the hub facing away from the coiled material.

11. The drum of claim 9, where the transponder is an RFID tag.

12. The drum of claim 9, where the hub has on its inner circumferential surface facing the hub axis at least one torque transmission member.

13. The drum of claim 9, wherein the at least one spaced member extends radially from an outer circumferential surface of one hub wall to an inner circumferential surface of the other hub wall.

* * * * *

UNITED STATES PATENT AND TRADEMARK OFFICE
CERTIFICATE OF CORRECTION

| | | |
|---|---|---|
| PATENT NO. | : 7,665,687 B2 | Page 1 of 1 |
| APPLICATION NO. | : 12/112619 | |
| DATED | : February 23, 2010 | |
| INVENTOR(S) | : Hein et al. | |

It is certified that error appears in the above-identified patent and that said Letters Patent is hereby corrected as shown below:

Title Page, Item (12) "Hein" should read -- Hein, et al. --.

Title Page, Item (75) Inventor is corrected to read:
-- Klaus Hein, Gedern (DE);
Joachim Meyrahn, Erzhausen (DE) --.

Signed and Sealed this
Twentieth Day of October, 2015

Michelle K. Lee
*Director of the United States Patent and Trademark Office*